United States Patent [19]

Scott

[11] Patent Number: 4,991,899
[45] Date of Patent: Feb. 12, 1991

[54] FOLDABLE TRUCK BED LINER

[75] Inventor: Dennis P. Scott, Hanover, Pa.

[73] Assignee: York Products, Inc., Hanover, Pa.

[21] Appl. No.: 440,317

[22] Filed: Nov. 22, 1989

[51] Int. Cl.$^5$ ............................................. B60R 13/01
[52] U.S. Cl. .................................................. 296/39.2
[58] Field of Search .................... 296/39.1, 39.2, 37.5; 105/423; 224/42.42

[56] References Cited

U.S. PATENT DOCUMENTS

| | | | |
|---|---|---|---|
| 1,916,344 | 7/1933 | Thoms et al. | 105/423 |
| 2,911,253 | 11/1959 | Dewey | 296/39.1 |
| 4,186,845 | 2/1980 | Podd | 296/39.1 X |
| 4,279,439 | 7/1981 | Cantieri | 296/39.2 |
| 4,693,507 | 9/1987 | Dresen et al. | 296/39.2 |
| 4,750,776 | 6/1988 | Barben | 296/39.2 |

FOREIGN PATENT DOCUMENTS 1260708  4/1961  France ................. 296/29.2

*Primary Examiner*—Margaret A. Focarino
*Assistant Examiner*—Gary C. Hoge
*Attorney, Agent, or Firm*—Clifford A. Poff

[57] ABSTRACT

A foldable protective liner for a truck cargo bed. All surfaces of the liner which may be subject to significant impact from cargo striking thereagainst have formed thereupon a plurality of protective ridge members. A storage container having similar ridge members formed on outer surfaces thereof may engage with the protective liner in an interfitting and interlocking relationship, to thereby support and affix the storage container in the truck cargo bed. The liner is foldable to a highly compact configuration for efficient storage and shipping. The foldability of the liner further eases its installation and removal from a truck cargo bed.

3 Claims, 7 Drawing Sheets

FOLDABLE TRUCK BED LINER

BACKGROUND OF THE INVENTION

1. Field of the Invention

The present invention relates generally to truck bed liners, and, more particularly, the present invention is directed to a truck bed liner which is foldable for compact shipping and storage and for ease of installation and/or removal from a truck cargo bed.

2. Description of the Prior Art

Pick-up trucks, long utilized as working vehicles, have, in recent years, become accepted for use as family cars. Pick-up trucks have also, of recent years, gained popularity as sport vehicles. Because of the multiple uses of a pick-up truck, attempts have been made to adapt the same pick-up truck to allow usage as a working vehicle in some instances, and a family car in other instances.

When the pick-up truck is utilized as a working vehicle, the aesthetic appearance of the pick-up truck is of little concern to the user. However, when the same pick-up truck is to be utilized as a family car, or as a sport vehicle, the aesthetic appearance of the pick-up truck is of substantial importance.

Many attempts to adapt the vehicle for dual usage provide some sort of protective layer or liner positioned in the cargo area of the pick-up truck to prevent the cargo area floor and walls from scratches, chips, and dents resulting from haulage of cargo in the truck cargo bed. When so desired, the protective liner may be removed from the cargo bed. Numerous truck liners are known in the art including U.S. Pat. Nos. 4,181,329 to Nix et al., 4,881,768 to Nix, 4,336,963 to Nix et al., 4,162,098 to Richardson III, 4,161,335 to Nix et al., 4,740,027 to Ormiston, 4,341,412 to Wayne, 4,111,481 to Nix et al., 4,592,583 to Dresen et al., 4,245,863 to Carter, 3,814,473 to Lorenzen, Jr. and 4,540,214 to Wagner. Each of the aforementioned patents disclose truck bed liners and/or protective inserts for the truck bed of a pick-up truck.

However, none of the truck bed liners disclosed in the aforesaid U.S. Patents provide adequate impact damage protection to all surfaces of the cargo bed—including the front and side walls of the bed, the floor of the bed, the inner wall of the tailgate, and the front, rear, top, and side walls of the wheel wells protruding upwardly into the bed—from impacts from cargo moving about the cargo bed.

Furthermore, the truck bed liners of the prior art are generally formed of large, bulky shells which, because of their bulk, are expensive to ship and cannot be compactly and efficiently stored by either a warehouse, a retail outlet or a private consumer. Still further, such large bulky shells are generally inflexible and relatively awkward to handle. Consequently, they are oftentimes difficult to install and/or remove from a truck cargo bed.

One disadvantage of a pick-up truck is the lack of storage space in the cab area of the pick-up truck. As a result, portable storage containers are placed in the cargo area of the pick-up truck for allowing the storage therewithin of material. For instance, quite frequently, tool chests are mounted in the cargo area of the pick-up truck to allow the storage therewithin of tools. However, the storage container must be securely attached to the pick-up truck. Otherwise, the storage container may slide about the cargo bed. This oftentimes necessitates the drilling of holes into the sidewalls and/or frontwalls of the truck cargo bed. In the event that a protective liner is also positioned in the truck cargo bed, bores must also be drilled through the truck bed liner to allow the storage container to be securely affixed to the pick-up truck. Such action makes removal of the truck bed liner from the truck cargo area more difficult and burdensome. Portability is a significant feature of many of the aforementioned prior art truck bed liners. Attachment of storage containers to the pick-up truck therefore greatly lessens the usefulness of many of the prior art truck bed liners.

It is therefore an object of the invention to provide a liner for a cargo bed of a pick-up truck which protects all surfaces of the cargo bed from impact damage.

It is a further object of the invention to provide a liner for a cargo bed of a pick-up truck which is foldable for compact shipping and storage.

It is a further object of the invention to provide a liner for a cargo bed of a pick-up truck which is foldable for ease of installation and/or removal from the cargo bed.

It is still a further object liner for a cargo bed of a pick-up truck which allows structures as simple as a length of wood and as sophisticated as a molded storage container to be firmly supported therein, but easily removable therefrom.

Still other objects and advantages of the present invention will become apparent in light of the attached drawings and description of the invention presented hereinbelow.

SUMMARY OF THE INVENTION

In accordance with the present invention a foldable protective liner for a truck cargo bed is disclosed. The protective liner allows a structure positioned in the cargo bed to be supported and affixed in position in the truck cargo bed. The protective liner includes a liner floor portion positioned upon a floor portion of the truck cargo bed, with the liner floor portion having elevated portions formed thereupon to conform to wheel wells protruding from the truck cargo bed floor. Upwardly extending liner sidewall portions extend upwardly from opposite sides of the liner floor portion, with each of the liner sidewall portions being positioned against sidewall portions of the truck cargo bed. An upwardly extending liner frontwall portion extends upwardly from a front end portion of the liner floor portion, with the liner frontwall portion being positioned against a frontwall portion of the truck cargo bed. The liner further preferably includes a ribbed tailgate liner for securement to and protection of the inner wall of the cargo bed tailgate. Means are formed on the upwardly extending liner sidewall portions and are adapted to engage with a structure positioned in the cargo bed to affix the structure to the liner sidewall portions, supporting the structure thereby.

According to the present invention, the means formed on the upwardly extending liner sidewall portions include a plurality of spaced apart, vertically extending ridge members protruding from the liner sidewall portions whereby gaps separating adjacent ones of the ridge members form load locks of a depth sufficient to anchor an end of the structure positioned in the truck cargo bed. Preferably, the load locks formed on opposite liner sidewall portions are situated to allow a first end of the structure to be anchored in a load lock formed on a first liner sidewall portion, and a second end of the structure to be anchored in a load lock formed on a second liner sidewall portion.

While the structure supported in the cargo bed may simply be a length of wood, in the preferred embodiment, the structure supported and affixed in the truck cargo bed is a storage container, such as a tool chest. Preferably, the tool chest is of a length to span a width of the truck cargo bed such that opposite ends of the tool chest abut against the upwardly extending liner sidewall portions positioned against the opposite sidewalls of the truck cargo bed. The opposite ends of the tool chest may further include means adapted to engage with the liner sidewall portions in an interlocking relationship, and may include a plurality of spaced apart, vertically extending ridge members.

In accordance with the present invention, the storage container further abuts against the upwardly extending liner frontwall portion, and the upwardly extending liner frontwall portion may further include a plurality of spaced apart, vertically extending ridge members protruding from the liner frontwall portions. The storage container may similarly have formed on the front side portion thereof a means adapted to engage with the liner frontwall portion in an interlocking relationship, and may include a plurality of vertically extending ridge members.

The bed liner of the present invention further includes ridge members similar in structure to the aforementioned vertically extending ridge members which protrude from virtually all portions of the bed liner in order to protect all surfaces of the cargo bed—including the front and side walls of the bed, the floor of the bed, the inner wall of the tailgate, and the front, rear, top, and side walls of the wheel wells protruding upwardly into the bed—which may be susceptible to impact damage from cargo striking thereagainst.

In a first embodiment of the invention in which the liner is provided with an outwardly extending cargo bed rail-supported flange and a second embodiment in which the liner has no such flange, the front wall of the bed liner is vertically severed for its full height at two intermediate locations situated inwardly of the innermost extent of the ridge members which protrude from the portions of the bed liner covering the inner side walls of the wheel wells. The severances permit a central portion of the front wall of the bed liner to be folded downwardly toward the liner floor portion while side regions of the liner—including the sidewall portions and wheel well portions of the liner as well as side portions of the front wall—to be folded inwardly toward each other along fold lines which are substantially collinear with the aforementioned severances and which extend along the length of the floor portion of the liner.

In a further embodiment of the present invention, the liner has no outwardly extending rail-supported flange and can be folded to a compact shipping and storage position by virtue of a unique rib arrangement provided in the frontwall portion of the liner which avoids the necessity for severances to be provided in the frontwall portion.

With any of the aforesaid embodiments, the foldability of the bed liner permits the liner to be compactly and inexpensively shipped and stored while at the same time permitting rapid installation and/or removal of the liner from a truck cargo bed.

BRIEF DESCRIPTION OF THE DRAWINGS

The present invention will be better understood when read in light of the accompanying drawings in which.

DESCRIPTION OF THE PREFERRED EMBODIMENTS

Figure 1:
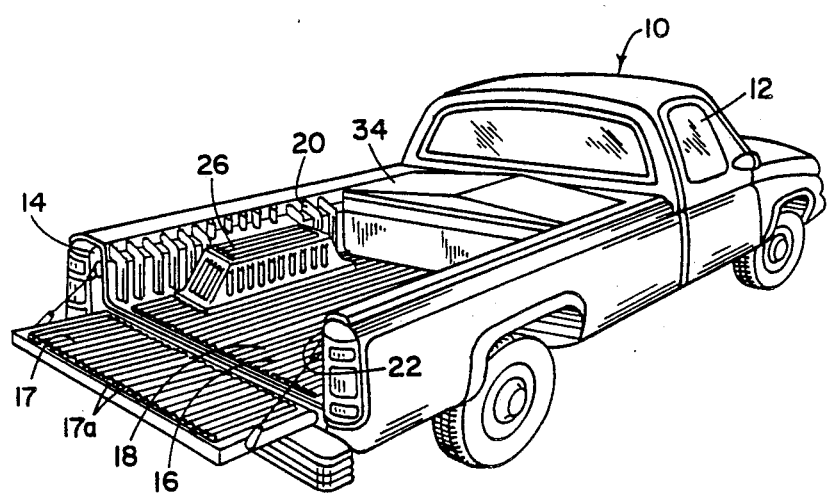
FIG. 1 is a perspective view of a pick-up truck having the truck bed liner in accordance with the present invention positioned in the cargo area thereof.

Referring first to the perspective illustration of FIG. 1, there is shown a pick-up truck 10 having a cab area 12 and a cargo bed area 14. The foldable truck bed liner 16 of the present invention is positioned within the cargo bed 14 and is preferably used in conjunction with a ribbed tailgate liner 17. Preferably, foldable truck bed liner 16 and the associated tailgate liner 17 are comprised of a polyethylene material, and the following detailed description will describe the present invention as such. However, it is to be understood that, alternatively, other materials of construction may be utilized to form bed liner 16 and tailgate liner 17 of the present invention.

Figure 2:
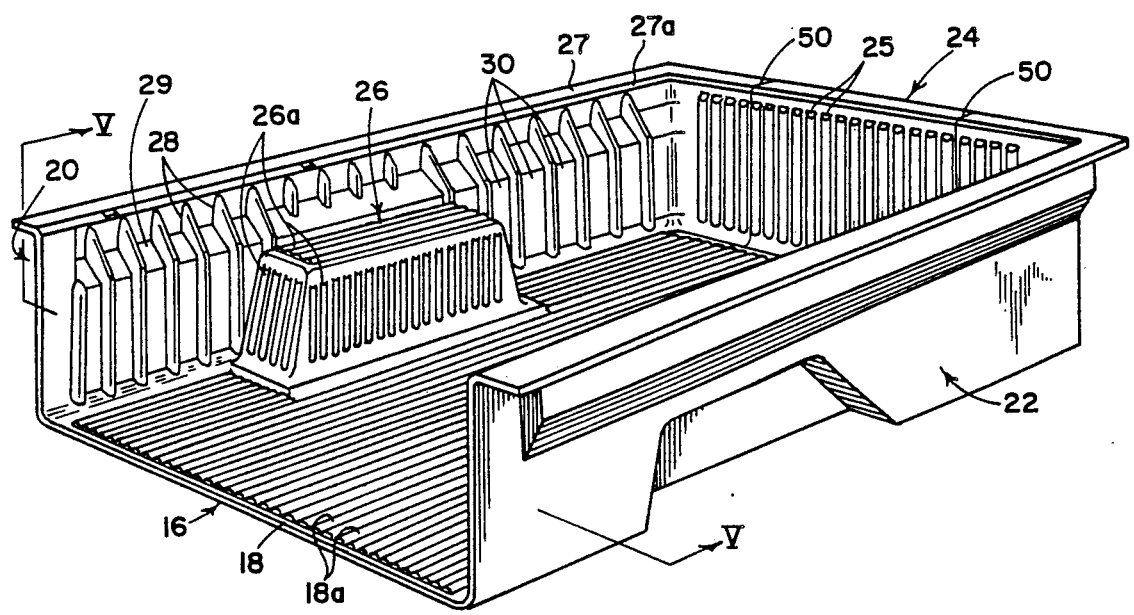
FIG. 2 is a perspective view of a first embodiment of the truck bed liner of the present invention.

A first embodiment of the foldable truck bed liner 16 of the present invention is shown in greater detail in FIG. 2. Truck bed liner 16 is shown to include liner floor portion 18, liner sidewall portions 20 and 22, and liner frontwall portion 24. Liner sidewall portions 20 and 22 are positioned to extend upwardly from opposite sides of liner floor portion 18, and liner frontwall portion 24 is positioned to extend upwardly from a front end of liner floor portion 18. Liner floor portion 18 further includes elevated portions 26 conforming to and accommodating wheel wells protruding from the truck cargo bed floor. Formed as such, truck bed liner 16 substantially covers the entire cargo bed 14 of pick-up truck 10 while tailgate liner 17 substantially covers the inner wall of the tailgate. Bed liner 16 and tailgate liner 17 thereby protect the cargo bed 14 and the tailgate from damage due to use of the pick-up truck 10 as a work vehicle.

Formed on the surface of liner sidewall portions 20 and 22 are a plurality of spaced apart, vertically extending ribs or ridge members 28. While FIG. 2 illustrates the inner surface of liner sidewall portion 20, the inner exposed surface of liner sidewall portion 22 is identical. At their upper edges, sidewall portions 20 and 22 and frontwall portion 24 are formed with flange-like cargo bed rail overlay portions 27 containing notched parts 27A. In subsequent embodiments to be described hereinbelow, the rail overlay portions 27 and notched parts 27a are omitted and the liner sidewall portions 20 and 22 and frontwall portion 24 are positioned under the rail of the cargo bed rail in an "under-rail" orientation. In accordance with the present invention, the ridge members 28 are continuous and upper and lower sections of the continuous ridge members are joined by a surface 29 which is inclined relative to the horizontal and which has a lower edge situated above the upper surface of the elevated portions 26.

Gaps 30 formed between, and separating, adjacent ones of the ridge members 28 in sidewall portions 20 and 22 form load locks of a depth sufficient to anchor a structure to prevent longitudinal movement of the structure in the cargo bed 14 of the pick-up 10. For example, a length of wood, such as a 2×4, may be positioned so that a first end thereof is positioned within a gap 30 between adjacent ridge members 28 formed on liner sidewall portion 20, and a second end of the length of the wood may be positioned to extend into a gap 30 separating two adjacent ridge members 28 formed on liner sidewall portion 22 in direct opposition to the gap 30 in sidewall portion 20.

Figure 3A:
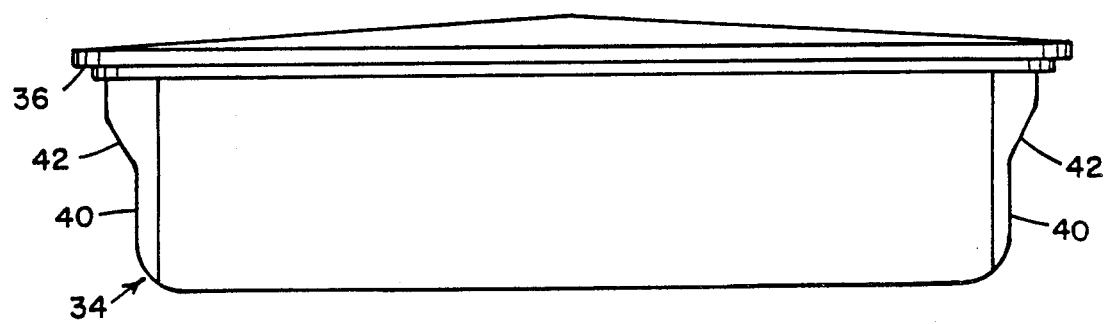
FIGS. 3A, 3B, and 3C are front, bottom, and end views, respectively, of a storage container which may be removably affixed to the truck bed liner of the present invention.
Figure 3B:
Figure 3C:
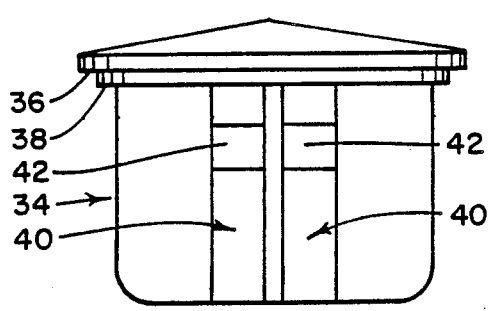

Turning now to the illustrations of FIGS. 3A-3C, there are shown front side, bottom, and end views, respectively, of a storage container 34 of the preferred embodiment which may be affixed in position in the truck cargo bed by truck bed 14 liner 16. Storage container 34 is preferably formed to provide a shoulder portion 38 of dimensions allowing the end portions of shoulder portion 38 to rest upon notched parts 27A of rail overlay 27. Storage container 34 is preferably provided with an appropriately dimensioned cover 36.

Figure 4:
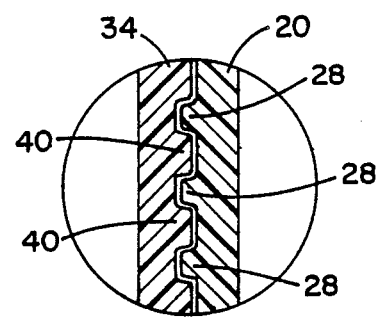
FIG. 4 is a detail view of the inter-fitting relationship between the storage container and protective liner of the present invention.

Storage container 34 has formed on the outer end surfaces thereof a plurality of spaced apart, vertically extending ridge members 40 for spanning the gaps 30 and interlocking with ridge member 28 formed on the inner surfaces of liner sidewall portions 20 and 22. The ribs or ridge members 40 of storage container 34 are further formed with an inclined surface 42 to allow positioning upon the inclined surface 29 of the liner sidewall portions 20 and 22. While only two are shown on each end of the storage container 34, it will be appreciated that any suitable number of ridge members 40 may be provided on the ends of container 34 depending, of course, on the desired size of storage container 34 to be used with the truck bed liner 16. When suitably positioned, ribs 40 formed on the storage container 34, and ridge member 28 formed on portions 20 and 22 of the liner, engage with one and other in an interfitting and mating relationship thereby preventing movement of storage container 34. This relationship is illustrated in the detail view of FIG. 4. Furthermore, the downward load exerted by storage container 34 due to its own weight and due to the weight of the contents thereof is distributed across shoulder portion 38, inclined surface 42, and the bottom surface of the container.

Referring again to the perspective illustration of FIG. 1, there is shown pick-up truck 10 having truck bed liner 16 and storage container 34 of the present invention positioned in the cargo bed area 14 thereof. As noted above, the interlocking relationship between ridges 28 and 40 prevents movement of storage container 34.

In each of FIGS. 1, 2, 5-7 and 9-12, it can be seen that, by virtue of an assortment of protruding ridge members, the foldable truck bed liner 16, along with tailgate liner 17, protects all of the surfaces of the truck cargo bed 14 which may be subject to impact damage from cargo striking thereagainst. The surfaces to be protected from impact damage include the sidewalls, frontwall and floor of the bed 14, the inner wall of the tailgate, and the front, rear, top, and inner side portions of the protruding wheel wells. A plurality of the ridge members provided on any of the aforementioned surfaces act in concert to cushion cargo impact by absorbing the impact energy through a number of the ridge members and thus distributing the energy over a larger surface area than would have been possible if no ridge members were present.

The ridge members or ribs 18a provided along the liner floor portion 18 extend for substantially the full length thereof, except, of course, where they are interrupted by the presence of the elevated portions 26. Similar ridge members or ribs 25 and 17a are provided on the frontwall portion 24 and tailgate liner 17, respectively. The ribs 17a, 18a and 25 are of a depth which is roughly half the depth of the ridge members 28 provided in the liner sidewall portions 20 and 22 in order to provide ample impact damage protection for the floor, sides and frontwall portion of the bed 14 as well as for the inner wall of the tailgate. Furthermore, it is preferred that the ridge members 26a formed on the front, rear, top, and inner sidewall surfaces of elevated wheel well accommodating portions 26 are of a depth comparable to ribs 18a so as to provide similar protection to those portions of the protruding wheel wells which are subject to cargo impact damage.

As can be seen in the embodiments depicted in FIGS. 2, 5-7 and 9, the foldability of the foldable truck bed liner 16 is effected by the provision of a pair of vertical slits 50 provided at two intermediate locations along the frontwall portion 24 of the liner 16. The pair of slits 50 extend for the full height of the frontwall portion 24 including the rail overlay portion 27 extending thereatop. The slits 50 are provided inwardly of the innermost extent of the ridge members 26a which protrude from the inner sidewall portions of the elevated wheel well accommodating portions 26. The slits 50 thus separate frontwall portion 24 into a central section 24a and side sections 24b and 24c. When installed in a truck cargo bed 14, the slitted frontwall portion 24 of the foldable truck bed liner 16 is provided with removable coupling means 52 which join edges of side sections 24b and 24c with opposite edges of central section 24a. The provision of the coupling means 52 adds structural rigidity and prevents collapse of the foldable truck bed liner 16 within the cargo bed 14. A preferred form of the coupling means 52 is illustrated in FIGS. 8 and 8a. However, any suitable means for releasably retaining the frontwall sections 24a, 24b and 24c in substantially vertical orientation when the liner 16 is in an unfolded and operative position within a truck cargo bed are considered to be within the scope of the present invention.

The simplest embodiment of the preferred coupling means 52 is shown in FIGS. 8 and 8A. In this particular embodiment, the coupling means 52 is formed of two spaced parallel planar portions 52a and 52b with a continuous web portion 52c joining portions 52a and 52b. As such, the coupling means 52 is essentially an elongated "H" shape in cross-section. Spaces 52d and 52e provided by the gaps of the "H" shaped cross section receive opposite edges of at least limited portions of the side edges of the central section 24a and one of the respective side sections 24b and 24c of frontwall portion 24. The coupling means 52 of FIGS. 10 and 10A may be of relatively short lengths to separately join limited segments of the severed frontwall portion 24 or they may be substantially equivalent in length to the full height of the frontwall portion.

Figure 5:
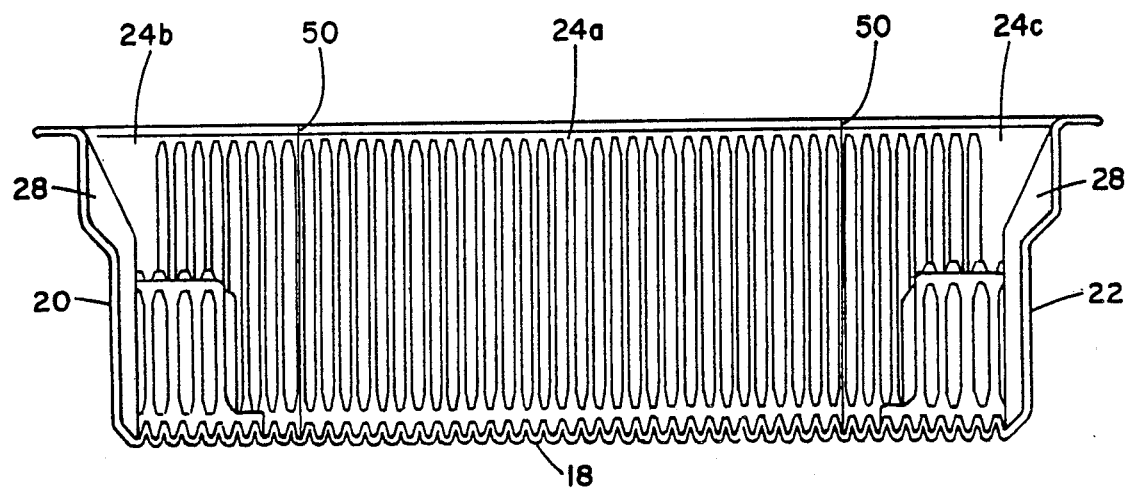
FIG. 5 is a view of the first embodiment of the truck bed liner as seen along line V—V of FIG. 2.
Figure 6:
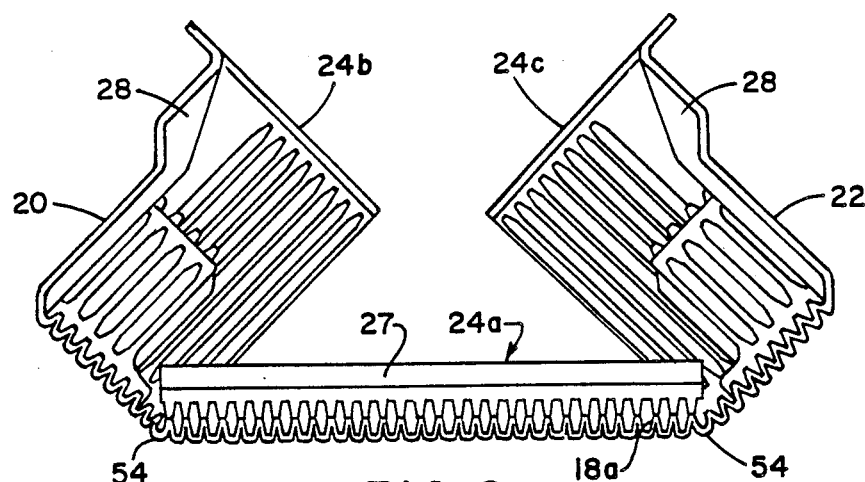
FIG. 6 is a view of the truck bed liner of FIG. 5 in partially folded condition.
Figure 7:
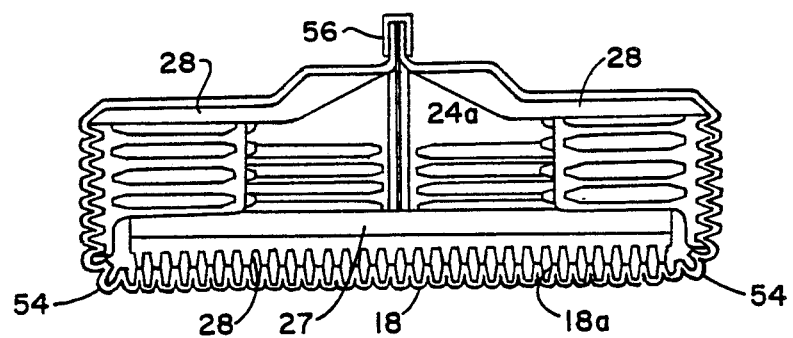
FIG. 7 is a view of the truck bed liner of FIG. 5 in fully folded condition.
Figure 8:
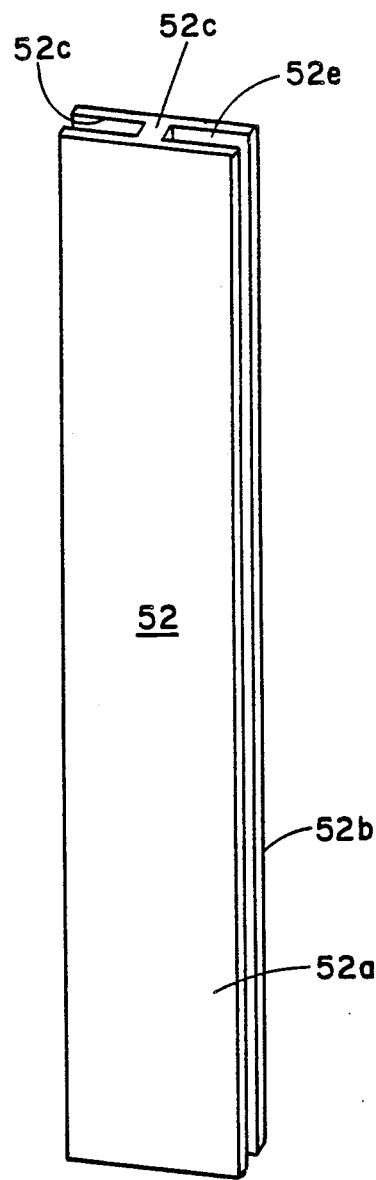
FIG. 8 is an enlarged perspective view of a coupling means used to join severed portions of the frontwall portion of the foldable truck bed liner in order to maintain the same in fully unfolded condition.
Figure 8A:
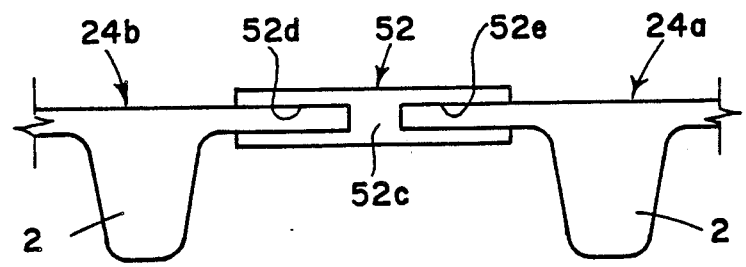
FIG. 8A is a top view of the coupling means of FIG. 8 illustrating the joining of severed sections of the frontwall portion of the foldable truck bed liner.
Figure 9:
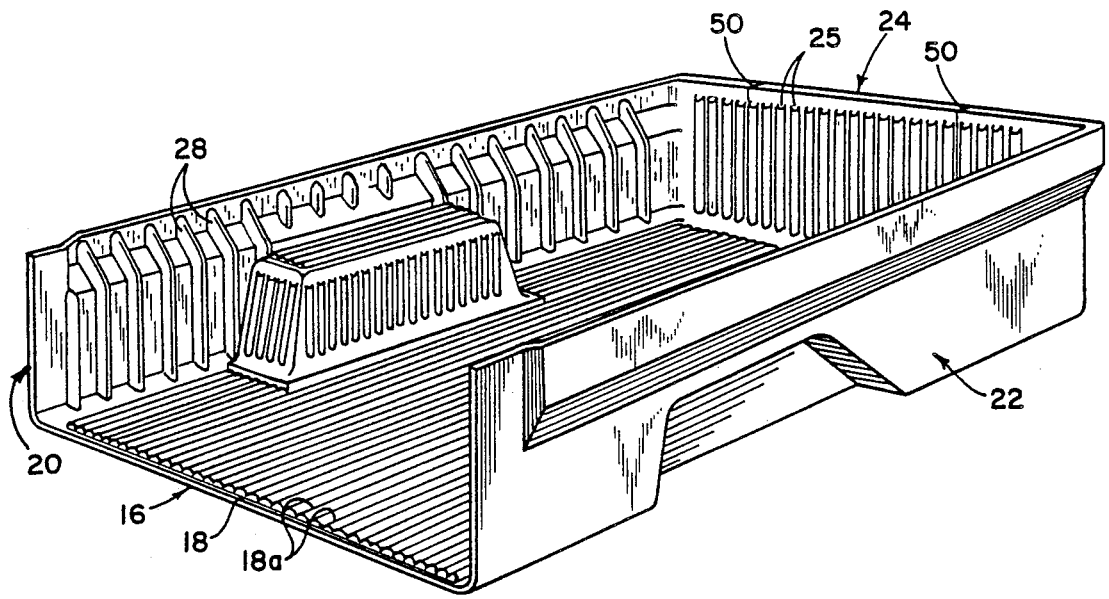
FIG. 9 is a perspective view of a second embodiment of the truck bed liner of the present invention.
Figure 14:
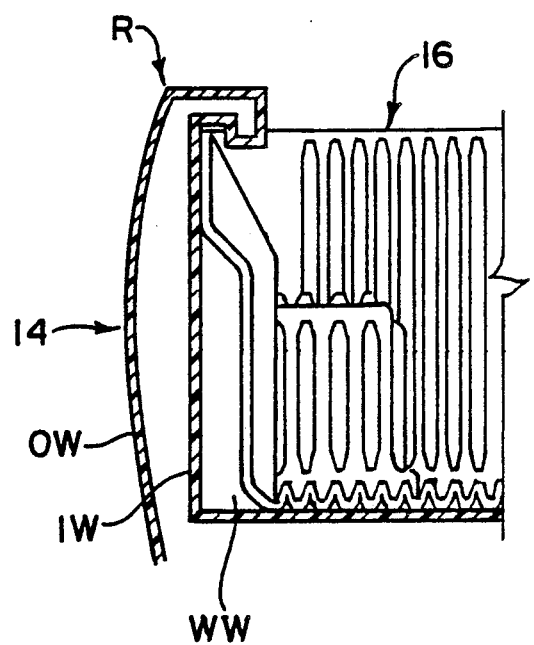
FIG. 14 illustrates the use of the second and third embodiments of the truck bed liner of the present invention as an "under-rail" liner.

Referring now to FIGS. 5-7, one can appreciate the folding operation of the first embodiment of the foldable truck bed liner 16 of the present invention as depicted in FIG. 2. It should be appreciated that the folding operation of the second embodiment depicted in FIG. 9 is identical since the embodiment of FIG. 9 is essentially the same as that illustrated in FIG. 2 except that the rail overlay portion 27 has been omitted so that the liner 16 can be used in an "under-rail" application as shown in FIG. 14. In FIG. 5, the foldable truck bed liner 16 is shown in its fully unfolded and operative position as it would be when positioned in a truck cargo bed. When it is desired to fold the truck bed liner to its folded, inoperative position for purposes of compact storage or shipping, adjacent severed sections 24a, 24b, and 24c are slightly separated and the respective coupling means 52 joining these sections are removed. The central section 24a of frontwall portion 24 is folded downwardly and inwardly so that it becomes essentially parallel with and rests above floor portion 18 as seen in FIGS. 6 and 7. The tailgate liner 17, although not shown in FIGS. 5-7, is then removed from the tailgate and is then placed atop floor portion 18 adjacent the downwardly folded central section 24a of frontwall portion 24.

When the central section 24a is fully folded downwardly and the tailgate liner 17 is properly placed, the liner sidewall portion 20 attached to side section 24b and the liner sidewall portion 22 attached to side section 24c are then folded inwardly toward each other along folding regions 54 which become created in floor portion 18 because of the inward folding of the sidewall portions 20 and 22 and the positioning of the slits 50. The folding regions 54 are substantially collinear with the slits 50. In the fully folded condition, the truck bed liner serves to enclose and protect the tailgate liner 17 during shipping and storage. The truck bed liner 16 can be retained in the fully folded configuration shown in FIG. 9 by any suitable fastening means 56 including belts, ropes, clamps, clasps, or the like.

In order to install the liner 16 depicted in either FIG. 2 or FIG. 9 in a truck, the reverse of the sequence shown in FIGS. 5-7 is obviously performed.

Figure 10:
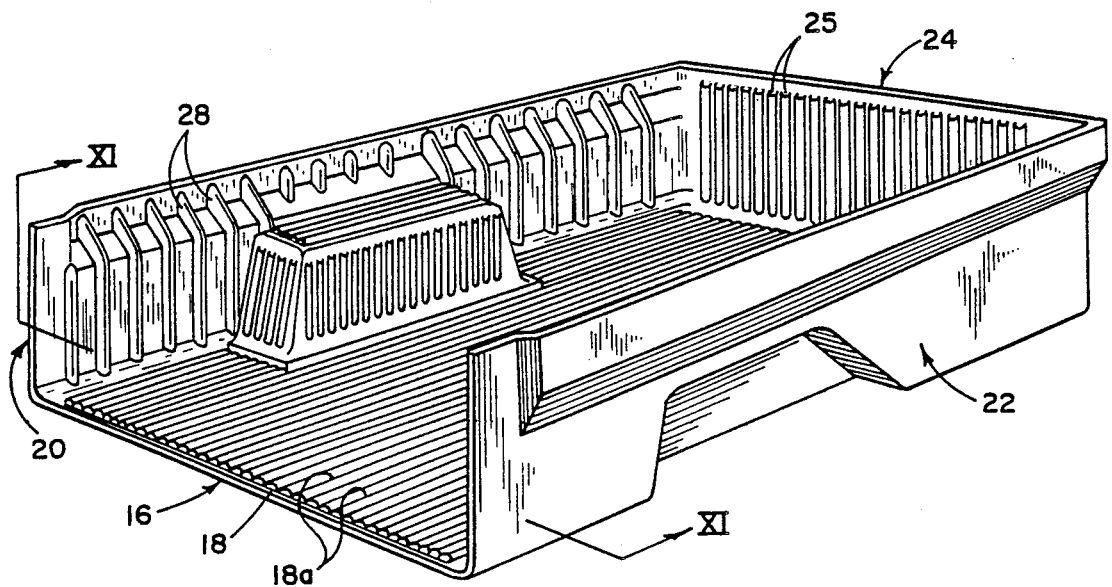
FIG. 10 is a perspective view of a third embodiment of the truck bed liner of the present invention.
Figure 11:
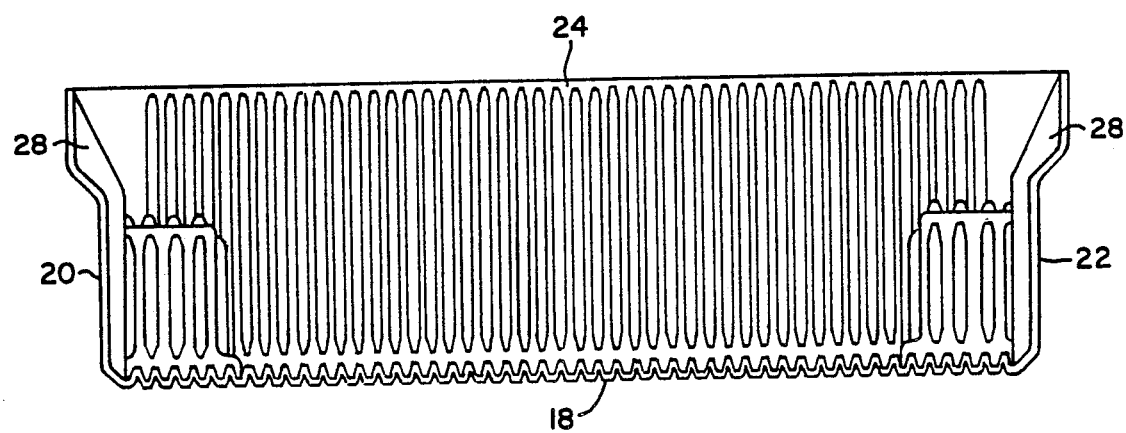
FIG. 11 is a view of the foldable truck bed liner as seen along line XI—XI of FIG. 10.
Figure 12:
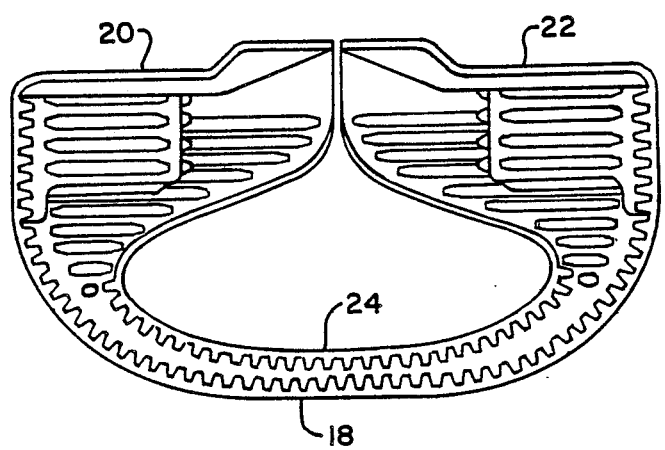
FIG. 12 is a view of the foldable truck bed liner of FIG. 10 in fully folded condition.

Referring now to FIGS. 10-12 there can be seen a third embodiment of the truck bed liner of the present invention in both unfolded and folded conditions.

The embodiment of the truck bed liner illustrated in FIG. 10 is similar to that shown in FIG. 9 except that the vertical slits 50 which were provided in the FIG. 9 embodiment have been omitted. As will be appreciated from reference to the liner folding operation depicted in FIGS. 11 and 12 and described herebelow, the frontwall portion 24 of the truck bed liner illustrated in FIG. 10 is formed of material which is of sufficient flexibility to permit bending thereof. A unique quality of the vertical ridge members 25 formed on the frontwall portion 24 of the FIG. 10 embodiment, which are essentially the same as those ridge members 25 disclosed in the other embodiments, is that while not only serving to protect the frontwall portion of the cargo bed from cargo impact damage, they also serve to permit repeated compact folding of the liner without the need for slits 50. The depth, spacing and rigidity of the ribs 25 in frontwall portion 24 shown in FIGS. 10-12 are selected such that the ribs 25 maintain their own integrity as well as that of the remainder of the frontwall portion 24 during repeated folding and unfolding of the liner. In other words, the ribs 25 prevent the creation of creases in both themselves as well as in the remainder of frontwall portion 24 which, in time, would lead to the formation of folding cracks in the frontwall portion 24 and consequently shorten the life of the liner 16.

The folding operation of the FIG. 10 embodiment is quite simple and the final compact storage position thereof is illustrated in FIG. 12. In order to obtain the configuration shown in FIG. 12, the frontwall portion 24 of the liner 16 is folded downwardly and inwardly similarly to section 24a previously discussed with regard the folding of the first and second embodiments described hereinabove. The downward folding of the frontwall portion 24 causes the sidewall portions 20 and 22 to be raised upwardly and inwardly such that the liner frontwall portion 24 obtains the substantially continuously curved configuration shown in FIG. 12. Simultaneously, the floor portion 18 of the liner 16 assumes a substantially semi-cylindrical configuration. As can now be appreciated, sharp creasing areas in frontwall portion 24 are thus avoided by the provision of ribs 25. Also, before folding the liner 16 from the unfolded position shown in FIG. 11 to the folded position of FIG. 12, the tailgate liner 17 is first placed on floor portion 18 as described above.

And, as should be appreciated, the liner 16 can be maintained in the FIG. 12 configuration by suitable fastening means (not shown) which may be similar to the fastening means 56 depicted in FIG. 7.

Figure 13:
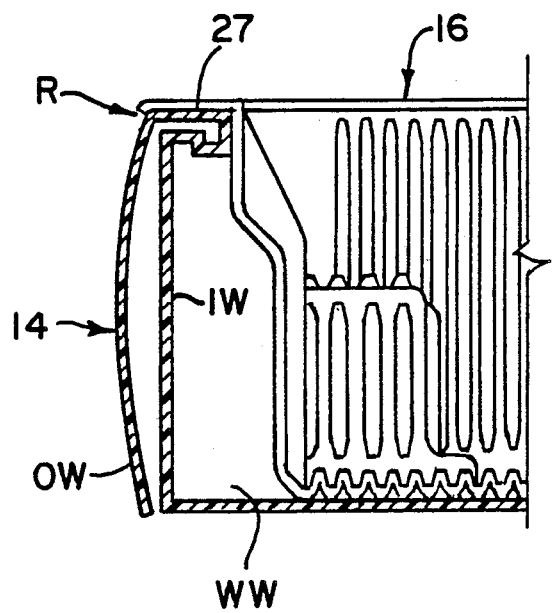
FIG. 13 illustrates the use of the first embodiment of the truck bed liner of the present invention as an "over-rail" liner.

Turning now to FIG. 13, there is shown the truck bed liner of the present invention as it would be used in an "over-rail" application in which the rail overlay portion 27 (FIGS. 1, 2 and 5-7) is supported upon the upper surface of rail "R" of cargo bed 14. Also shown are the outer wall "OW", inner wall "IW" and wheel well "WW" of the cargo bed 14.

FIG. 14 illustrates the truck bed liner of the present invention as it would be used in an "under-rail" application in which the rail overlay portion 27 is omitted (FIG. 9-12). In such an "under-rail" application, the liner sidewall portions would abut directly up against the inner wall "IW" of the cargo bed 14 and the upper edges of the sidewall portions would be retained beneath the rail "R".

From the foregoing it can be appreciated that the foldability of the truck bed liner of the present invention advantageously reduces its dimensions to thereby reduce its shipping costs. Furthermore, the compactness of the liner 16 in folded condition permits highly compact and efficient storage thereof in warehouses, retail outlets and even the homes and/or garages of private consumers.

Lastly, the foldability of the truck bed liner constructed according to the present invention provides easy installation and removal of the liner from a truck bed in contrast with inflexible prior art liners which are cumbersome and frequently become jammed during installation and/or removal from a truck bed.

While the present invention has been described in connection with the preferred embodiments shown in the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the recitation of the appended claims.

I claim:

1. A foldable protective liner for a vehicle cargo bed, said liner comprising:
   a liner floor portion positionable upon a floor portion of the vehicle cargo bed, said liner floor portion having elevated portions formed thereupon to conform to wheel wells protruding from the vehicle cargo bed floor;
   liner sidewall portions extending upwardly from opposite sides of the liner floor portion, each of said liner sidewall portions being positionable against sidewall portions of the vehicle cargo bed;
   a liner frontwall portion extending upwardly from a front end of the liner floor portion and integrally joined to the liner floor portion and each of the liner sidewall portions, said liner frontwall portion being positionable against a frontwall portion of the truck cargo bed and formed of a material which is of sufficient flexibility to permit bending thereof; and
   means provided on said liner for permitting repeated folding of said liner from an unfolded operative position to a folded inoperative position and repeated unfolding of said liner from said folded inoperative position to said unfolded operative position, said means for permitting repeated folding and repeated unfolding comprising vertically extending rib means provided on said liner frontwall portion, said rib means being of such depth, spacing and rigidity so as to prevent creasing of said rib means and said frontwall portion during folding of said liner and to provide effective cargo impact energy absorption and distribution when said liner is in said operative position in a vehicle cargo bed, whereby said unfolded operative position constitutes a normal use arrangement of said liner and said folded inoperative position constitutes a compact storage arrangement of said liner.

2. The foldable protective liner of claim 1 further comprising a tailgate liner, said tailgate liner being stored within said liner when said liner is in said folded inoperative position.

3. The foldable protective liner of claim 1 further comprising a plurality of spaced apart, vertically extending ridge members protruding from the liner sidewall portions and forming load locks in gaps separating adjacent ones of the ridge members, said load locks having a depth sufficient to anchor a structure positioned and supported in the cargo bed.

* * * * *